United States Patent
Kim et al.

(10) Patent No.: US 10,000,162 B2
(45) Date of Patent: Jun. 19, 2018

(54) SPEAKER DEVICE FOR VEHICLE, AND VEHICLE HAVING THE SPEAKER DEVICE

(71) Applicant: HYUNDAI MOTOR COMPANY, Seoul (KR)

(72) Inventors: YoungKyu Kim, Seoul (KR); Jung Uk Noh, Seoul (KR); Jong Suh Park, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/341,081

(22) Filed: Nov. 2, 2016

(65) Prior Publication Data
US 2017/0361779 A1 Dec. 21, 2017

(30) Foreign Application Priority Data
Jun. 21, 2016 (KR) .................. 10-2016-0077149

(51) Int. Cl.
| | |
|---|---|
| *B60R 11/02* | (2006.01) |
| *H04R 1/34* | (2006.01) |
| *H04R 1/02* | (2006.01) |
| *H04R 1/28* | (2006.01) |
| *B60R 11/00* | (2006.01) |

(Continued)

(52) U.S. Cl.
CPC .......... *B60R 11/0217* (2013.01); *H04R 1/025* (2013.01); *H04R 1/345* (2013.01); *B60R 2011/004* (2013.01); *B60R 2011/0024* (2013.01); *B60R 2011/0036* (2013.01); *B60R 2011/0038* (2013.01); *H04R 1/2842* (2013.01);
*H04R 5/02* (2013.01); *H04R 2499/13* (2013.01); *H04S 5/005* (2013.01)

(58) Field of Classification Search
CPC ......... B60R 11/0217; B60R 2011/0024; B60R 2011/0036; B60R 2011/0012; B60R 2011/004; B60R 2011/0038; H04R 1/2842; H04R 2499/13; H04R 5/02; H04S 5/005
See application file for complete search history.

(56) References Cited

U.S. PATENT DOCUMENTS

| | | |
|---|---|---|
| 4,549,631 A | 10/1985 | Bose |
| 5,193,118 A | 3/1993 | Latham-Brown et al. |

(Continued)

FOREIGN PATENT DOCUMENTS

| | | | |
|---|---|---|---|
| DE | 19909143 A1 * | 11/2000 | ......... B60R 11/0217 |
| EP | 0904985 A1 | 3/1999 | |

(Continued)

*Primary Examiner* — Davetta W Goins
*Assistant Examiner* — Kuassi Ganmavo
(74) *Attorney, Agent, or Firm* — McDermott Will & Emery LLP

(57) ABSTRACT

A speaker device for a vehicle includes a speaker unit, an enclosure mounted to a vehicle body accommodating the speaker unit, and provided with an inner space which is divided into a front space into which a front sound of the speaker unit is radiated and a rear space into which a rear sound of the speaker unit is radiated by a division member, a first path connecting the front space to a first division space provided in the vehicle body, a second path connecting the rear space to a second division space provided in the vehicle body, and a front sound outlet connecting the front space to an indoor space of the vehicle.

16 Claims, 8 Drawing Sheets

(51) Int. Cl.
  *H04S 5/00* (2006.01)
  *H04R 5/02* (2006.01)

(56) References Cited

U.S. PATENT DOCUMENTS

| | | | |
|---|---|---|---|
| 6,310,958 B1* | 10/2001 | Eisner | B60R 11/0217 |
| | | | 181/141 |
| 2009/0185709 A1* | 7/2009 | Linhard | B60R 13/0237 |
| | | | 381/389 |
| 2009/0279733 A1* | 11/2009 | Schuster | B60R 13/0237 |
| | | | 381/389 |
| 2009/0284055 A1 | 11/2009 | Aylward et al. | |
| 2013/0188806 A1* | 7/2013 | Tada | H04R 1/2803 |
| | | | 381/86 |
| 2014/0241547 A1* | 8/2014 | Sulowski | B60R 11/0217 |
| | | | 381/86 |

FOREIGN PATENT DOCUMENTS

| | | |
|---|---|---|
| JP | H08253082 A | 10/1996 |
| JP | 09-37371 A | 2/1997 |
| JP | 10-108290 A | 4/1998 |
| JP | H10291443 A | 11/1998 |
| JP | 2007251895 A | 9/2007 |
| JP | 2013-229730 A | 11/2013 |
| KR | 100271870 B1 | 3/2001 |
| WO | 2012152897 A2 | 11/2012 |

\* cited by examiner

SPEAKER DEVICE FOR VEHICLE, AND VEHICLE HAVING THE SPEAKER DEVICE

CROSS-REFERENCE TO RELATED APPLICATION(S)

This application claims the benefit of priority to Korean Patent Application No. 10-2016-0077149, filed on Jun. 21, 2016 with the Korean Intellectual Property Office, the disclosure of which is incorporated herein by reference.

TECHNICAL FIELD

Embodiments of the present disclosure relate to a speaker device for a vehicle capable of outputting a good sound while allowing an enclosure to be compact, and a vehicle having the speaker device.

BACKGROUND

A speaker device is typically manufactured such that a speaker unit configured to output a sound is mounted to an enclosure having a box shape. The sound of the speaker unit may be distorted since a sound generated in the front surface of a vibration plate and a sound generated in the rear surface of the vibration plate may interact with each other. Therefore, the enclosure may prevent the interaction between the front sound of the speaker unit and the rear sound of the speaker unit so that improved sound may be outputted. In addition, a resonance space placed inside of the enclosure may reinforce a low sound to improve sound quality.

However, there may be a number of limitations on mounting the speaker device to a vehicle. An enclosure having a large volume may be required to output a good sound, but it may be difficult to mount the enclosure having a large volume to an indoor space of a vehicle having a small space. In addition, the enclosure having a large volume may increase a weight of the vehicle, and may increase a manufacturing cost of the vehicle.

SUMMARY

Therefore, it is an aspect of the present disclosure to provide a speaker device for a vehicle capable of outputting an improved sound while allowing an enclosure to be compact, and a vehicle having the same.

Additional aspects of the present disclosure will be set forth in part in the description which follows and, in part, will be obvious from the description, or may be learned by practice of the present disclosure.

In accordance with one aspect of the present disclosure, a speaker device for a vehicle includes a speaker unit, an enclosure mounted to a vehicle body while accommodating the speaker unit, and provided with an inner space which is divided into a front space into which a front sound of the speaker unit is radiated and a rear space into which a rear sound of the speaker unit is radiated by a division member, a first path configured to connect the front space to a first division space provided in the vehicle body, a second path configured to connect the rear space to a second division space provided in the vehicle body, and a front sound outlet configured to connect the front space to an indoor space of the vehicle.

The speaker device for a vehicle may include a rear sound outlet configured to connect the rear space to an indoor space of the vehicle.

The first path and the second path may be respectively connected to the first division space and the second division space provided in a side sill structure of the vehicle body.

The first path and the second path may be respectively connected to the first division space and the second division space provided in a cross member of the vehicle body.

The speaker unit may be mounted to the division member such that a front surface of the speaker unit is exposed to the front space and a rear surface of the speaker unit is exposed to the rear space.

The front sound outlet may include a duct member extended from an opening formed in the enclosure toward the inside of the front space.

The rear sound outlet may include a duct member extended from an opening formed in the enclosure toward the inside of the rear space.

In accordance with another aspect of the present disclosure, a vehicle includes a vehicle body provided with a first division space and a second division space, and a speaker device installed in the vehicle body, wherein the speaker device comprises a speaker unit, an enclosure mounted to the vehicle body while accommodating the speaker unit, and provided with an inner space which is divided into a front space into which a front sound of the speaker unit is radiated and a rear space into which a rear sound of the speaker unit is radiated by a division member, a first path configured to connect the front space to the first division space, a second path configured to connect the rear space to the second division space, and a front sound outlet configured to connect the front space to an indoor space of the vehicle.

The first division space and the second division space may be formed to be divided in a side sill structure of the vehicle body.

The side sill structure may include at least one partition configured to divide an inside of the side sill structure in a direction perpendicular to a longitudinal direction and configured to reinforce the rigidity of the side sill structure.

The first division space and the second division space may be provided in a cross member of the vehicle body.

In accordance with still another aspect of the present disclosure, a vehicle includes a vehicle body provided with a first division space and a second division space, and a speaker device installed in the vehicle body, wherein the speaker device includes a speaker unit, an enclosure mounted to the vehicle body while accommodating the speaker unit, and provided with an inner space which is divided into a front space into which a front sound of the speaker unit is radiated and a rear space into which a rear sound of the speaker unit is radiated by a division member, a first path configured to connect the front space to the first division space, and a second path configured to connect the rear space to the second division space, wherein the vehicle body include a front sound outlet configured to connect the first division space to an indoor space of the vehicle.

The vehicle body may include a rear sound outlet configured to connect the second division space to an indoor space of the vehicle.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

The present disclosure will now be described more fully with reference to the accompanying drawings, in which exemplary embodiments of the disclosure are shown. In the description of the present disclosure, if it is determined that a detailed description of commonly-used technologies or structures related to the embodiments of the present disclosure may unnecessarily obscure the subject matter of the present disclosure, the detailed description will be omitted.

FIGS. 1 to 4 are views illustrating a case in which a speaker device for a vehicle is mounted to a side sill structure of a vehicle body in accordance with a first embodiment of the present disclosure.

Figure 1:
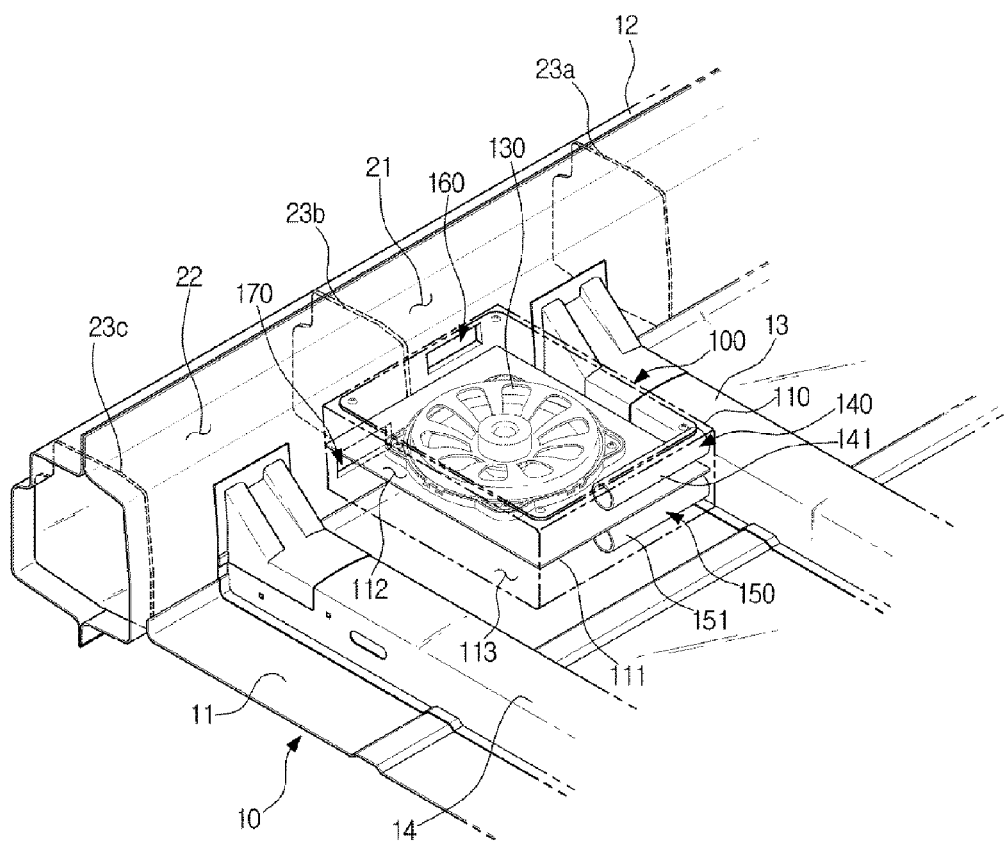
FIG. 1 is a perspective view illustrating a case in which a speaker device is mounted to a vehicle body in accordance with a first embodiment of the present disclosure.

Referring to FIG. 1, a vehicle body 10 placed in a lower side of a driver seat or a passenger seat of a vehicle include, in some implementations, a floor panel 11; a side sill structure 12 extended in a front and rear side of the vehicle while being coupled to opposite sides of the floor panel 11; and cross members 13 and 14 extended in a vehicle width direction while being coupled to the floor panel 11 so as to reinforce the floor panel 11.

Figure 2:
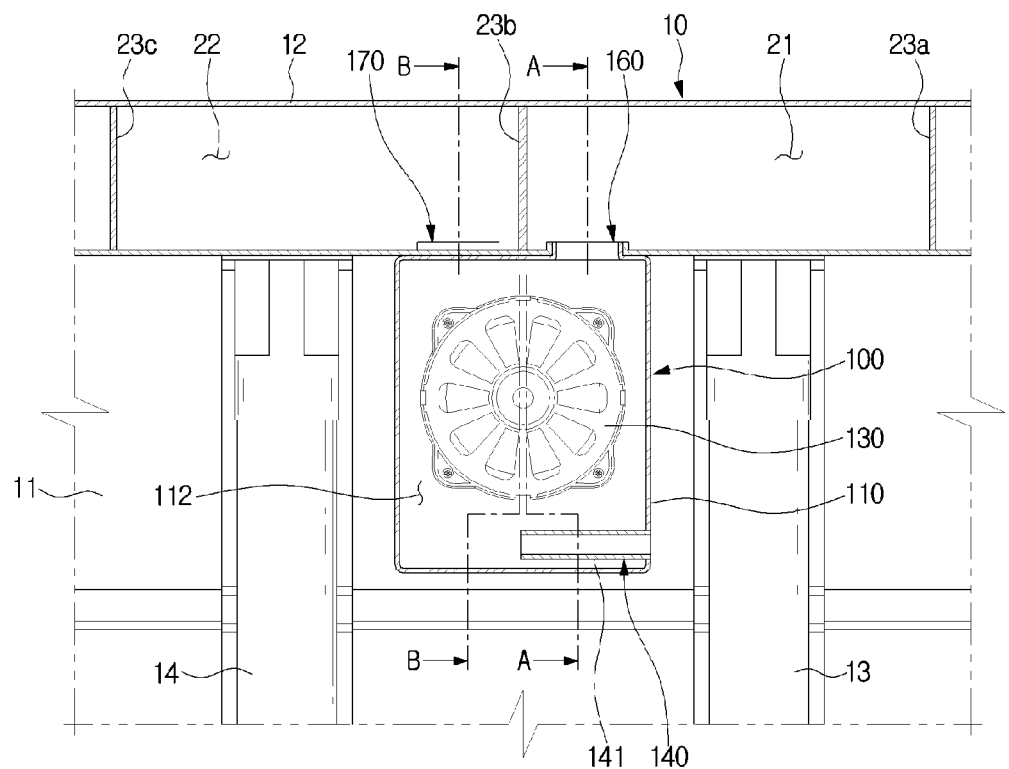
FIG. 2 is a plane view illustrating a case in which a speaker device is mounted to a vehicle body, particularly where a part of a side sill structure and an enclosure are cut in accordance with a first embodiment of the present disclosure.

A speaker device 100 is disposed in a lower portion of an indoor space that is adjacent to the floor panel 11 of the vehicle body 10, and one side of the speaker device 100 is coupled to the inside of the side sill structure 12, in some implementations. As illustrated in FIGS. 1 and 2, the speaker device 100 may be disposed between a front cross member 13 and a rear cross member 14 for the efficient use of a lower space of the driver seat and the passenger seat.

The speaker device 100 may include an enclosure 110 formed to be a hollow hexahedral structure and a speaker unit 130 placed inside of the enclosure 110 and configured to output a sound.

Figure 3:
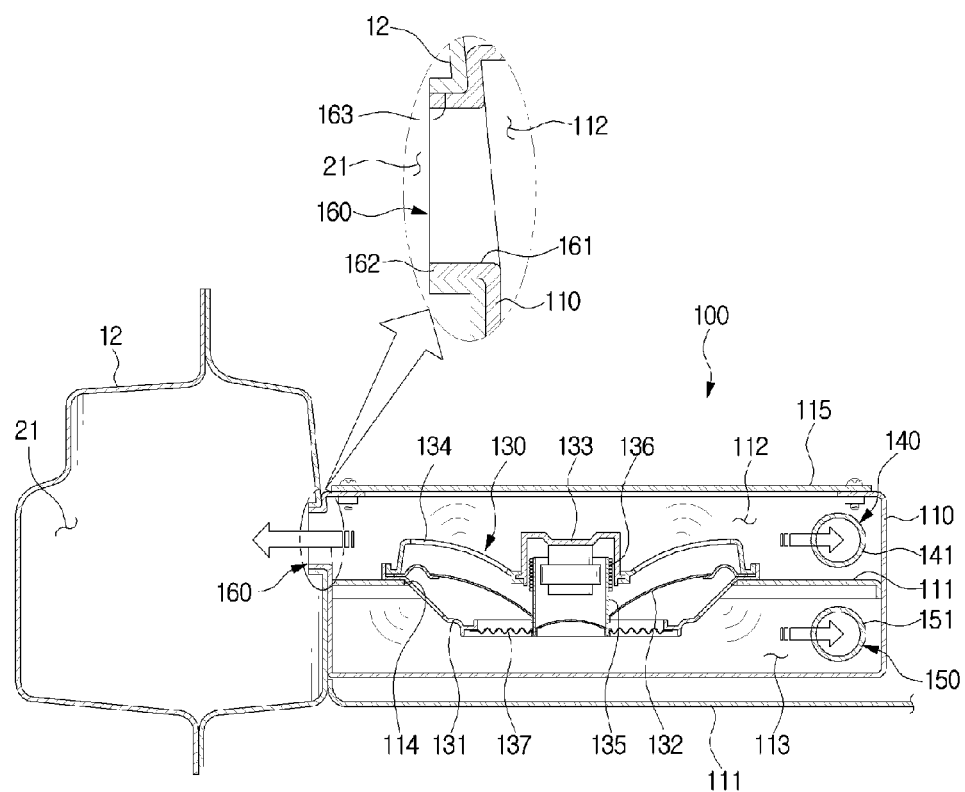
FIG. 3 is a cross-sectional view taken along line A-A' of FIG. 2.

The inside of the enclosure 110 may be divided into a front space 112 and a rear space 113 by a division member 111, wherein a front sound of the speaker unit 130 may be radiated in the front space 112 and a rear sound of the speaker unit 130 may be radiated in the rear space 113. As illustrated in FIG. 3, the division member 111 may be a flat plate configured to divide the enclosure 110 into the front space 112 in an upper side and the rear space 113 in a lower side, and may include a speaker mounting hole 114 placed in an approximate middle portion thereof for mounting of the speaker unit 130.

As illustrated in FIG. 3, the speaker unit 130 may include a frame 131, a vibration plate 132 installed inner side of the frame 131, a magnetic circuit 133 installed in a front side of the vibration plate 132 to vibrate the vibration plate 132, a supporting member 134 configured to support the magnetic circuit 133, a bobbin 135 installed in the middle portion of the vibration plate 132 and in which a voice coil 136 is wound at outer surface thereof in a direction of the magnetic circuit 133, and a damper 137 configured to support the bobbin 135. The speaker unit 130 may output a sound such that when a sound current is applied to the front cross member 13, the bobbin 135 is vibrated and a vibration of the bobbin 135 vibrates the vibration plate 132.

A case in which the magnetic circuit 133 is placed in the front side of the vibration plate 132 is illustrated as an example of the speaker unit 130, but the type of the speaker unit 130 according to the present disclosure is not limited thereto. The speaker unit 130 may have various types, e.g. the magnetic circuit 133 placed in the rear side of the vibration plate.

When the speaker unit 130 is installed inside of the enclosure 110, the speaker unit 130 may be mounted to the speaker mounting hole 114 of the division member 111 such that a front surface of the speaker unit 130 faces the front space 112 and a rear surface of the speaker unit 130 faces the rear space 113. That is, the rear surface of the speaker unit 130 may be inserted into the rear space 113 through the speaker mounting hole 114 and the speaker unit 130 may be easily installed in the speaker mounting hole 114 since a plurality of fixation screws are coupled to an edge portion of the frame 131 of the speaker unit 130. In a process of installation, a sealing member may be placed between the edge portion of the frame 131 of the speaker unit 130 and the division member 111 to seal an area therebetween.

When the speaker unit 130 is installed, the front space 112 and the rear space 113 of the enclosure 110 may be completely divided, and thus the front sound and the rear sound may be isolated in the enclosure 110. Therefore, the sound of the speaker unit 130 may be radiated such that the front sound is radiated to the front space 112 and the rear sound is radiated to the rear space 113.

The enclosure 110 may be integrally formed with the speaker unit 130 while the enclosure 110 accommodates the speaker unit 130. Alternatively, as illustrated in FIG. 3, an upper surface of the enclosure 110 may be opened or closed by a cover 115 so that the speaker unit 130 is allowed to be mounted or detached. In this description, the enclosure 110 having an openable upper surface is illustrated as an example, but the type of the enclosure 110 according to this disclosure is not limited thereto. A part of an upper surface, a lower surface, and a plurality of lateral surfaces of the enclosure 110 may be opened or closed by a cover for mounting the speaker unit 130. Alternatively, the enclosure 110 may be manufactured such that an upper side and a lower side of the enclosure 110 are manufactured, respectively and then coupled to each other.

As illustrated in FIGS. 1 to 4, the speaker device 100 may include a front sound outlet 140 configured to connect the front space 112 of the enclosure 110 to the indoor space of the vehicle; and a rear sound outlet 150 configured to connect the rear space 113 of the enclosure 110 to the indoor space of the vehicle. Therefore, the front sound of the speaker unit 130 that is output toward the front space 112 may be output to the indoor space of the vehicle via the front sound outlet 140, and the rear sound of the speaker unit 130 that is output toward the rear space 113 may be output to the indoor space of the vehicle via the rear sound outlet 150.

The front sound outlet 140 may include a duct member 141 extended from an opening, which is formed on a side surface of the front space 112 of the enclosure 110 to be connected to the outside, to an inner side of the front space 112. The rear sound outlet 150 may include a duct member 151 extended from an opening, which is formed on a side surface of the rear space 113 of the enclosure 110 to be connected to the outside, to an inner side of the rear space 113.

The front sound outlet 140 and the rear sound outlet 150 may have various sizes of the opening and various lengths of the duct member 141 and 151 to adjust an output sound frequency. The duct member 141 of the front sound outlet 140 and the duct member 151 of the rear sound outlet 150 may be different from each other.

As illustrated in FIGS. 1 and 2, the enclosure 110 may be coupled to the side sill structure 12 of the vehicle body 10 such that one side of the enclosure 110 is closely attached to an outer surface of an inside of the side sill structure 12 of the vehicle body 10. The side sill structure 12 to which the enclosure 110 is coupled may be divided into a first division space 21 in a front portion of the vehicle and a second division space 22 in a rear portion of the vehicle by a front partition 23a, a middle partition 23b and a rear partition 23c.

The front partition 23a, the middle partition 23b and the rear partition 23c may reinforce a rigidity of the side sill structure 12 as well as dividing the space since the front partition 23a, the middle partition 23b, and the rear partition 23c are installed to divide the inside of the side sill structure 12 in a direction perpendicular to a longitudinal direction of the side sill structure 12. Therefore, when installing the speaker device 100 in the side sill structure 12, a lowering in rigidity of the side sill structure 12 may be prevented. The installation position of the front partition 23a and the rear partition 23c may vary to adjust the volume of the first division space 21 and the second division space 22.

FIGS. 1 and 2 illustrate a case in which the front partition 23a, the middle partition 23b and the rear partition 23c are installed in the side sill structure 12 to divide the space into the first division space 21 and the second division space 22, but are not limited thereto. When a front side and a rear side of the side sill structure 12 are closed, only the middle partition 23b is installed.

The first division space 21 of the side sill structure 12 may be connected to the front space 112 of the enclosure 110 via a first path 160 and the second division space 22 of the side sill structure 12 may be connected to the rear space 113 of the enclosure 110 via a second path 170.

As illustrated in FIG. 3, the first path 160 may include an opening 161 formed on one side surface of the front space 112 of the enclosure 110 in a direction of the first division space 21 and a first duct 162 extended from the opening 161 to have a shape of slightly entering to the inside of the first division space 21 of the side sill structure 12. In addition, an opening 163 which is coupled to the first duct 162 may be formed on a side surface of the first division space 21 of the side sill structure 12.

Figure 4:
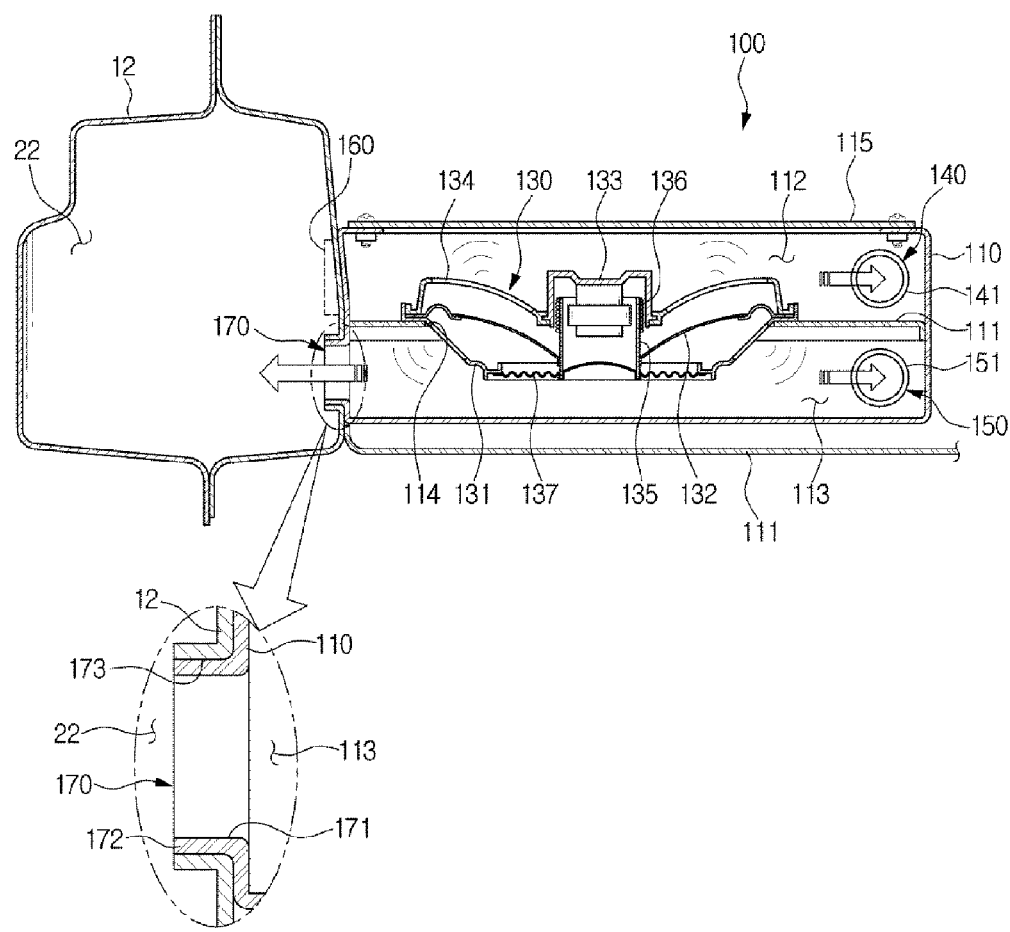
FIG. 4 is a cross-sectional view taken along line B-B' of FIG. 2.

As illustrated in FIG. 4, the second path 170 may include an opening 171 formed on one side surface of the rear space 113 of the enclosure 110 in a direction of the second division space 22 and a second duct 172 extended from the opening 171 to have a shape of slightly entering to the inside of the second division space 22 of the side sill structure 12. In addition, an opening 173 which is coupled to the second duct 172 may be formed on a side surface of the second division space 22 of the side sill structure 12.

In this disclosure, the first path 160 including the first duct 162 and the second path 170 including the second duct 172 are illustrated as an example, and the type of the first path 160 and the second path 170 is not limited thereto. The first path 160 and the second path 170 may have a shape in which an opening formed in the enclosure 110 and an opening formed in the side sill structure 12 are coupled to each other without a structure, e.g. a duct while facing to each other. Alternatively, when the enclosure 110 is installed to be apart from the side sill structure 12, the opening 161 and the second duct 172 may be extended.

When the front space 112 of the enclosure 110 is connected to the first division space 21 of the side sill structure 12 through the first path 160, the front space 112 and the first division space 21 may perform a function of a resonance space of the front sound that is output from the speaker unit 130 so that it is possible to obtain an effect to expand the resonance space for the front sound while the volume of the front space 112 of the enclosure 110 is reduced.

In the same way, when the rear space 113 of the enclosure 110 is connected to the second division space 22 of the side sill structure 12 through the second path 170, the rear space 113 and the second division space 22 may perform a function of a resonance space of the rear sound that is output from the speaker unit 130 so that it is possible to obtain an effect to expand the resonance space for the rear sound while the volume of the rear space 113 of the enclosure 110 is reduced.

Accordingly, the first division space 21 and the second division space 22 formed inside of the side sill structure 12 may expand the resonance space of the front and rear sound of the speaker unit 130 to allow a low band sound having a good quality to be output. In addition, the volume of the front space 112 and the rear space 113 may be reduced to allow the enclosure 110 to be compact, and thus in the vehicle, an occupation of space for installing the speaker device 100 may be minimized.

Figure 5:
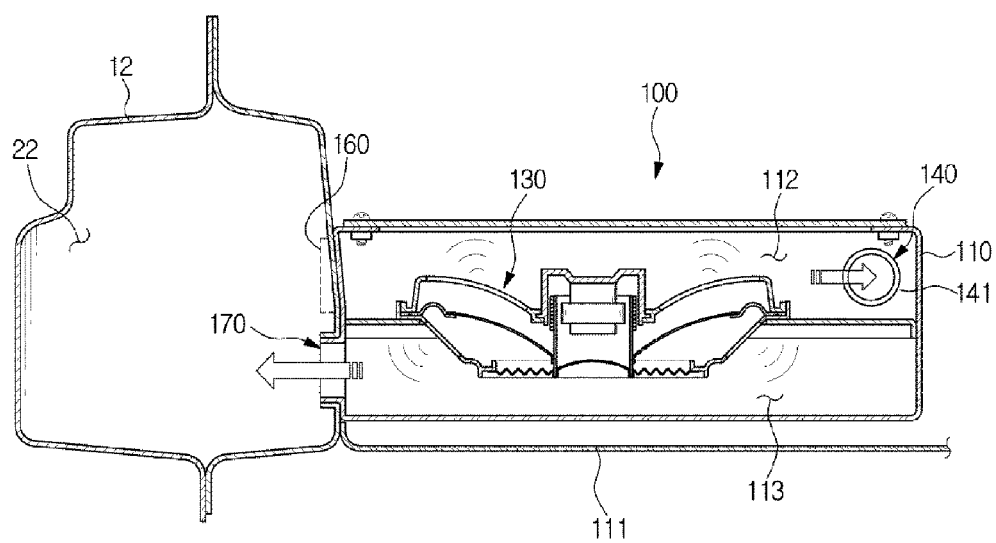
FIG. 5 is a cross-sectional view illustrating a case in which a speaker device is mounted to a vehicle body in accordance with a second embodiment of the present disclosure.

FIG. 5 illustrates a speaker device and a vehicle body in accordance with a second embodiment of the present disclosure. A configuration of the second embodiment is the same as the first embodiment excluding the rear sound outlet 150. The rest of the second embodiment is the same as the first embodiment.

According to the second embodiment, the speaker device may exclude a rear sound outlet. Therefore, a rear space 113 of an enclosure 110 and a second division space 22 of a side sill structure 12 to which a rear sound is delivered may be formed as a closed space. That is, a resonance space of the rear sound may be formed in a closed type. According to the closed type, the interference between the front sound and the rear sound of the speaker unit 130 may be completely prevented so that an improved sound may be output and a relatively lower sound may be reproduced.

Figure 6:
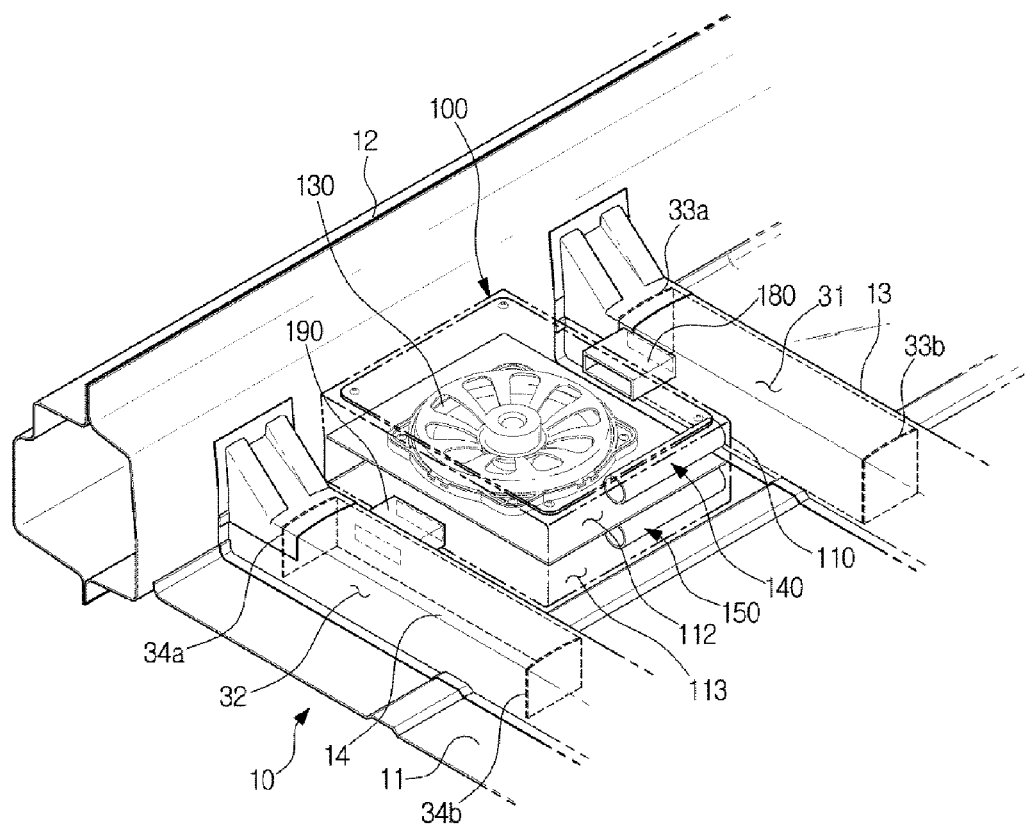
FIG. 6 is a perspective view illustrating a speaker device and a vehicle body in accordance with a third embodiment of the present disclosure.

FIG. 6 illustrates a speaker device and a vehicle body in accordance with a third embodiment of the present disclosure. According to the third embodiment, a first division space 31 may be provided in a cross member 13 in a front portion of a vehicle body 10, and a second division space 32 may be provided in a cross member 14 in a rear portion of the vehicle body 10.

A first path 180 may connect the front space 112 of the enclosure 110 to the first division space 31 of the front cross member 13, and a second path 190 may connect the rear space 113 of the enclosure 110 to the second division space 32 of the rear cross member 14. At least one of partition 33a, 33b, 34a and 34b may be installed in the front cross member 13 and the rear cross member 14 to form the first and second division space 31 and 32. By changing an installation position of the partition, the volume of each division space may be adjusted.

According to the third embodiment, the first division space 31 and the second division space 32 formed in the front cross member 13 and the rear cross member 14 may expand the resonance space of the front and rear sound of the speaker unit 130 to allow a low band sound having a good quality to be output. In addition, the volume of the front space 112 and the rear space 113 may be reduced to allow the enclosure 110 to be compact, and thus in the vehicle, an occupation of space for installing the speaker device 100 may be minimized.

Figure 7:
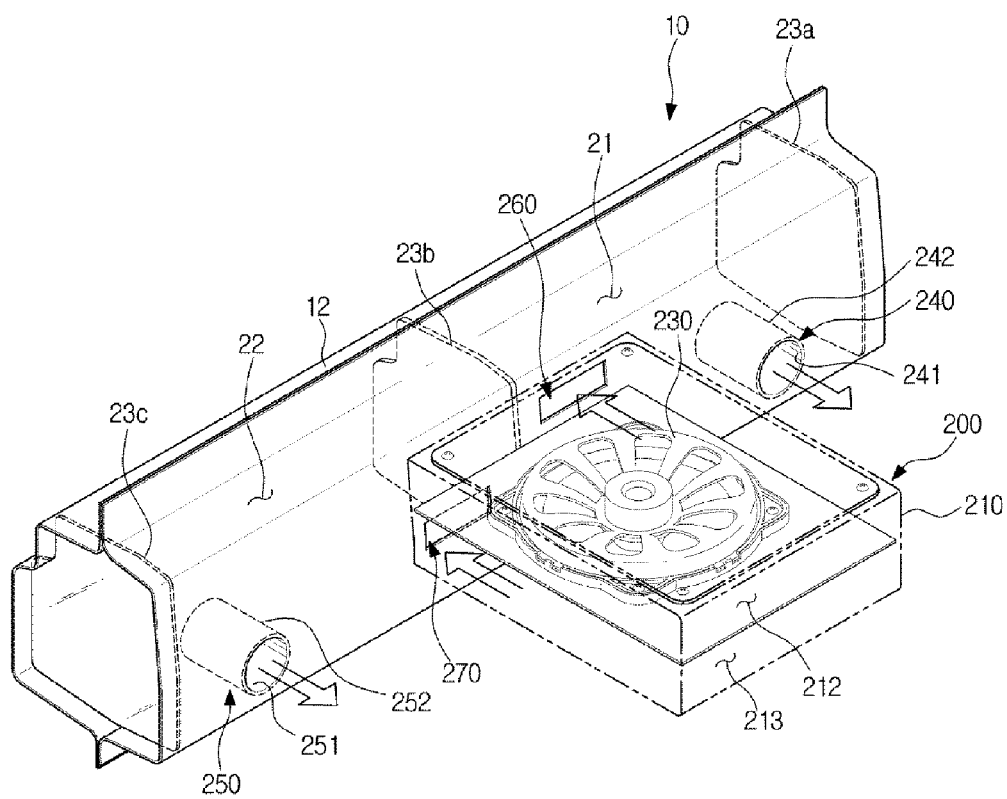
FIG. 7 is a perspective view illustrating a speaker device and a vehicle body in accordance with a fourth embodiment of the present disclosure.

FIG. 7 illustrates a speaker device and a vehicle body in accordance with a fourth embodiment of the present disclosure. According to the fourth embodiment, a first division space 21 and a second division space 22 may be provided in a side sill structure 12 of a vehicle body 10. A front space 212 of an enclosure 210 may be connected to the first division space 21 via a first path 260, and a rear space 213 of an enclosure 210 may be connected to the second division space 22 via a second path 270.

According to the fourth embodiment, a front sound outlet 240 and a rear sound outlet 250 may be provided in the side sill structure 12. The enclosure 210 may exclude an outlet configured to output a sound. The front sound outlet 240 may be provided in the side sill structure 12 in a side of the first division space 21 to connect the first division space 21 to an indoor space of the vehicle, and the rear sound outlet 250 may be provided in the side sill structure 12 in a side of the second division space 22 to connect the second division space 22 to an indoor space of the vehicle.

Therefore, the front sound of the speaker unit 230 may be output to the indoor space of the vehicle through the front space 212 of the enclosure 210 and the first division space 21 of the side sill structure 12, and the rear sound of the speaker unit 230 may be output to the indoor space of the vehicle through the rear space 213 of the enclosure 210 and the second division space 22 of the side sill structure 12.

The front sound outlet 240 may include a duct member 242 extended to have a certain length from an opening 241, which is formed on a side surface of the side sill structure 12 to be connected to the indoor space of the vehicle, toward the inside of the first division space 21. The rear sound outlet 250 may include a duct member 252 extended to have a certain length from an opening 251, which is formed on a side surface of the side sill structure 12 to be connected to the indoor space of the vehicle, toward the inside of the second division space 22.

According to the fourth embodiment, the first division space 21 and the second division space 22 may expand the resonance space of the front and rear sound of the speaker unit 230 to allow a low band sound having a good quality to be output. In addition, the volume of the front space 212 and the rear space 213 of the enclosure 210 may be reduced to allow the enclosure 210 to be compact, and thus in the vehicle, an occupation of space needed for installing the speaker device 200 may be minimized.

Although not shown in the drawings, according to the fourth embodiment, it may be possible to exclude the rear sound outlet 250 provided in the side sill structure 12. In this case, the rear space 213 of the enclosure 210 and the second division space 22 of the side sill structure 12, to which the rear sound of the speaker unit 230 is delivered, may be formed as a closed space. In the same way as the second embodiment, the resonance space of the rear sound may be formed in a closed type.

Figure 8:
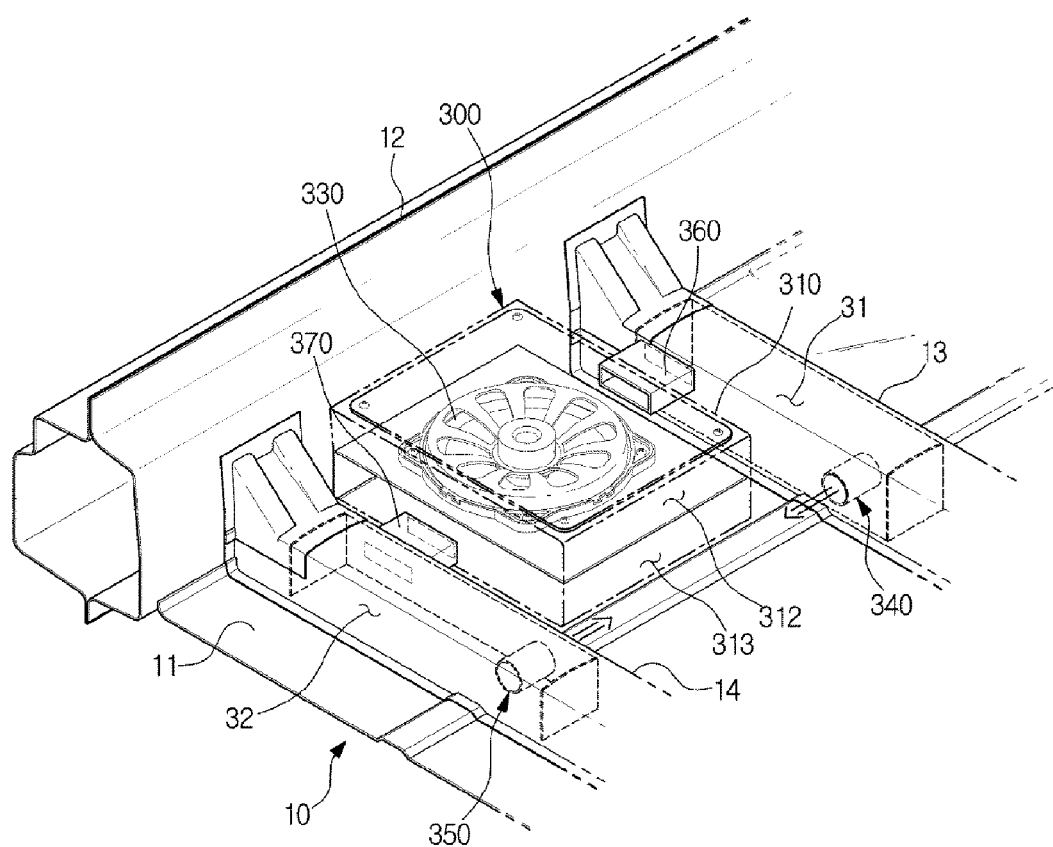
FIG. 8 is a perspective view illustrating a speaker device and a vehicle body in accordance with a fifth embodiment of the present disclosure.

FIG. 8 illustrates a speaker device and a vehicle body in accordance with a fifth embodiment of the present disclosure. The fifth embodiment is modified from the third embodiment. According to the fifth embodiment, a front sound outlet 340 may be provided in a first division space 31 formed in a front cross member 13 and a rear sound outlet 350 may be provided in a second division space 32 formed in a rear cross member 14.

A speaker device 300 may include an enclosure 310 provided with a front space 312 and a rear space 313, and a speaker unit 330. A first path 360 may connect the front space 312 of the enclosure 310 to the first division space 31, and a second path 370 may connect the rear space 313 of the enclosure 310 to the second division space 32. There may be no an outlet configured to output a sound in the enclosure 310.

The effect of the fifth embodiment may be similar to the effect of the third and fourth embodiment. According to the fifth embodiment, it may be possible to exclude the rear sound outlet 350 provided in the rear cross member 14.

As is apparent from the above description, according to the proposed speaker device for a vehicle and vehicle having the speaker device, it may be possible to expand the resonance space of the front and rear sound of the speaker unit since the front space of the enclosure is connected to the first division space provided in the vehicle body, through the first path, and the rear space of the enclosure is connected to the second division space provided in the vehicle body, through the second path.

In addition, it may be possible to allow the enclosure to be compact by reducing the volume of the front and rear space of the enclosure, and thus it may be possible to minimize an occupation of space for installing the speaker device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A speaker device for a vehicle comprising:
   a speaker unit;
   an enclosure mounted to a vehicle body accommodating the speaker unit, and provided with an inner space which is divided into a front space into which a front sound of the speaker unit is radiated and a rear space into which a rear sound of the speaker unit is radiated by a division member;
   a first path connecting the front space of the enclosure to a first division space provided in the vehicle body;
   a second path connecting the rear space of the enclosure to a second division space, which is provided in the vehicle body and is divided from the first division space; and
   a front sound outlet connecting the front space to an indoor space of the vehicle.

2. The speaker device for a vehicle of claim 1, further comprising a rear sound outlet connecting the rear space to an indoor space of the vehicle.

3. The speaker device for a vehicle of claim 2, wherein the rear sound outlet comprises a duct member extended from an opening formed in the enclosure toward the inside of the rear space.

4. The speaker device for a vehicle of claim 1, wherein the first path and the second path are respectively connected to the first division space and the second division space provided in a side sill structure of the vehicle body.

5. The speaker device for a vehicle of claim 1, wherein the first path and the second path are respectively connected to the first division space and the second division space provided in a cross member of the vehicle body.

6. The speaker device for a vehicle of claim 1, wherein the speaker unit is mounted to the division member such that a front surface of the speaker unit is exposed to the front space and a rear surface of the speaker unit is exposed to the rear space.

7. The speaker device for a vehicle of claim 1, wherein the front sound outlet comprises a duct member extended from an opening formed in the enclosure toward the inside of the front space.

8. A vehicle comprising;
a vehicle body provided with a first division space and a second division space which is divided from the first division space; and
a speaker device installed in the vehicle body,
wherein the speaker device comprises:
a speaker unit;
an enclosure mounted to the vehicle body and accommodating the speaker unit, and provided with an inner space which is divided into a front space into which a front sound of the speaker unit is radiated and a rear space into which a rear sound of the speaker unit is radiated by a division member;
a first path connecting the front space of the enclosure to the first division space;
a second path connecting the rear space of the enclosure to the second division space; and
a front sound outlet connecting the front space to an indoor space of the vehicle.

9. The vehicle of claim 8, wherein the speaker device further comprises a rear sound outlet connecting the rear space to an indoor space of the vehicle.

10. The vehicle of claim 8, wherein the first division space and the second division space are formed to be divided in a side sill structure of the vehicle body.

11. The vehicle of claim 10, wherein the side sill structure comprises at least one partition dividing an inside of the side sill structure in a direction perpendicular to a longitudinal direction and configured to reinforce the rigidity of the side sill structure.

12. The vehicle of claim 8, wherein the first division space and the second division space are provided in a cross member of the vehicle body.

13. A vehicle comprising:
a vehicle body provided with a first division space and a second division space which is divided from the first division space; and
a speaker device installed in the vehicle body,
wherein the speaker device comprises:
a speaker unit;
an enclosure mounted to the vehicle body while accommodating the speaker unit, and provided with an inner space which is divided into a front space into which a front sound of the speaker unit is radiated and a rear space into which a rear sound of the speaker unit is radiated by a division member;
a first path connecting the front space of the enclosure to the first division space; and
a second path connecting the rear space of the enclosure to the second division space,
wherein the vehicle body comprises a front sound outlet for connecting the first division space to an indoor space of the vehicle.

14. The vehicle of claim 13, wherein the vehicle body further comprises a rear sound outlet connecting the second division space to an indoor space of the vehicle.

15. The vehicle of claim 13, wherein the first division space and the second division space are provided in a side sill structure of the vehicle body, wherein the side sill structure comprises at least one partition dividing an inside of the side sill structure in a direction perpendicular to a longitudinal direction and reinforcing the rigidity of the side sill structure.

16. The vehicle of claim 13, wherein the first division space and the second division space are provided in a cross member of the vehicle body.

* * * * *